July 16, 1968  H. OOMS  3,392,686
MACHINE FOR THE AUTOMATIC PRODUCTION
OF DOUGH-LUMPS FOR BAKERIES
Original Filed May 9, 1961  3 Sheets-Sheet 1

INVENTOR.
Hugo Ooms
BY
Watson, Cole, Grindle & Watson
Attys.

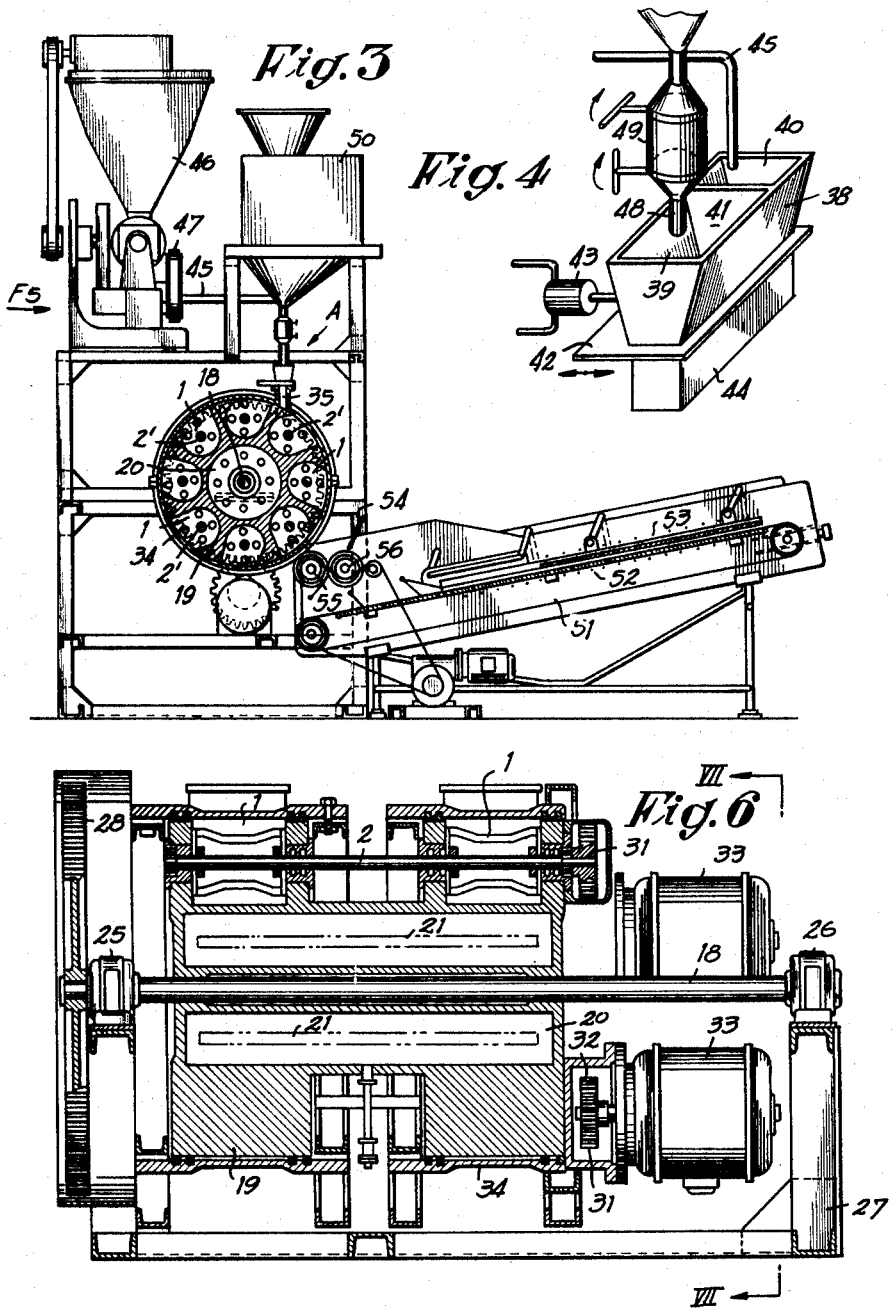

July 16, 1968
H. OOMS
3,392,686
MACHINE FOR THE AUTOMATIC PRODUCTION
OF DOUGH-LUMPS FOR BAKERIES
Original Filed May 9, 1961
3 Sheets-Sheet 3
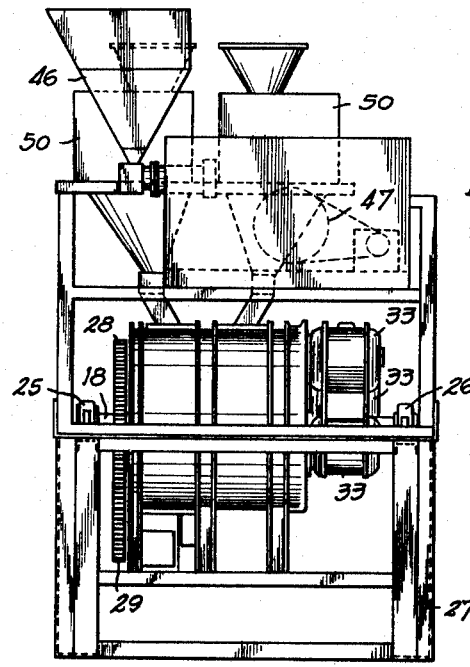
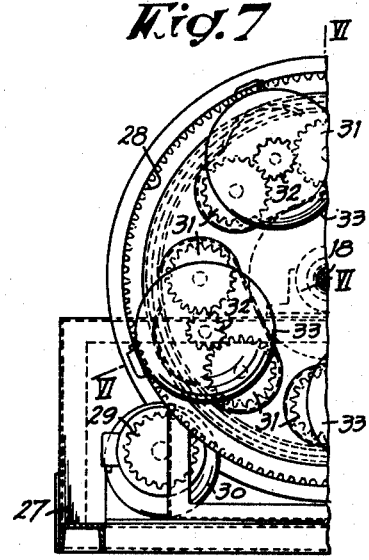 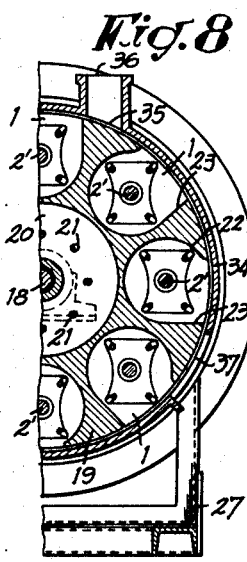 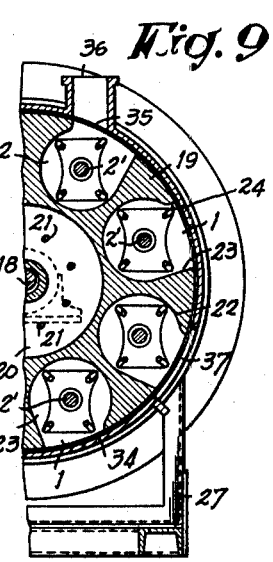
INVENTOR.
Hugo Ooms
BY
Watson, Cole, Grindle & Watson
Attys.

United States Patent Office 3,392,686
Patented July 16, 1968

3,392,686
MACHINE FOR THE AUTOMATIC PRODUCTION OF DOUGH-LUMPS FOR BAKERIES
Hugo Ooms, Antwerp, Belgium, assignor to Ateliers de Construction Guillaume Ooms, S.A., Mortsel, near Antwerp, Belgium
Original application May 9, 1961, Ser. No. 108,915, now Patent No. 3,252,806, dated May 24, 1966. Divided and this application Feb. 21, 1966, Ser. No. 529,030
Claims priority, application Belgium, June 27, 1960, 592,301
11 Claims. (Cl. 107—4)

ABSTRACT OF THE DISCLOSURE

A machine for preparing dough-lumps for bakeries having flour and ferment containers with individual kneading troughs having stirring and kneading elements. Means are provided for conveying measured amounts of flour and ferment and driving and stirring means and finally conditioning devices to maintain the constituent ingredients inside the machine.

---

This is a division of application Ser. No. 108,915, filed May 9, 1961, now Patent No. 3,252,806.

This invention relates to a machine for the automatic production of dough-lumps for bakeries.

In the machines of this type which have already been suggested, a comparatively large quantity of ingredients of which the dough-lumps are made, is continuously kneaded, the thus obtained product being discharged in continuous bands and subsequently divided into dough-lumps. The main drawback of these machines is that they include delicate, costly and bulky devices for continuously and permanently weighing and/or measuring the above ingredients. Also the comparatively large quantity of kneaded substances limits speed to a considerable extent, and the subsequent division into dough-lumps constitutes a further drawback.

It is therefore an object of the present invention to provide a machine of the above type, but which does not present the above drawbacks.

The machine according to the invention comprises in combination at least one container for a reserve of flour; at least one container for a reserve of ferment at high temperature; a plurality of individual kneading troughs of which the capacity corresponds to the amount of dough needed for a dough-lump; stirring and kneading elements in said kneading troughs; means for conveying each time toward said kneading troughs separate amounts of flour duly measured for corresponding to a dough-lump; means for conveying toward said kneading troughs said ferment at high temperature in separate amounts of which each one corresponds to the amount required for a dough-lump; means for driving said stirring and kneading elements of said individual kneading troughs at a high speed which is generally comprised between 200 and 750 r.p.m.; means for ensuring the discharge of the dough-lumps from said individual kneading troughs; and conditioning devices in order to the maintain the constituent ingredients, i.e. said flour and ferment, of the dough-lumps, inside the machine, was well as the dough-lumps themselves, at a minimum temperature of between 38° C. and 45° C.

The invention will be more clearly understood from the detailed description given below, without implying any limitations, with reference to the appended drawings, of which:

FIGURE 3 is a longitudinal vertical section on a plane along line III—III of FIGURE 2, in which the elements of the superstructure have been represented diagrammatically;

FIGURE 4 is a diagrammatic perspective view of the part marked A in FIGURE 3;

FIGURE 5 is a side view in the direction of arrow F5 of FIGURE 3;

FIGURE 6 is a longitudinal vertical section on a plane through line VI—VI of FIGURE 7;

FIGURE 7 is one half of a cross-section along line VII—VII of FIGURE 6;

FIGURE 8 is one half of a cross-section of the drum and the individual kneading troughs;

FIGURE 9 is similar to FIGURE 8, but with this difference that the ring is represented thereby in a position which it occupies when a kneading trough is being loaded whilst another kneading trough is being loaded and another kneading trough is being emptied.

Figure 1:
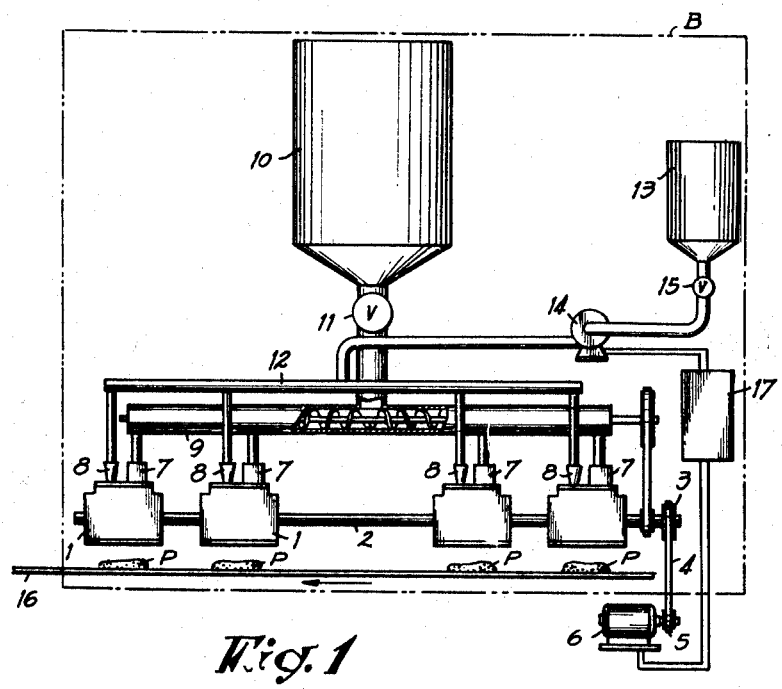
FIGURE 1 is a diagrammatic and simplified representation of the essential elements of a machine according to applying the method of the present invention.

As represented diagrammatically and in the simplest possible way in FIGURE 1, the machine according to the present invention comprises at least a certain number of individual kneading troughs 1 of which the mobile elements are driven either by an individual motor, or by one or several joined motors.

In the example which has been diagrammatically illustrated, the case of one common motor has been represented, this diagrammatic representation comprising the common shaft 2, the pulley 3, the belt 4, the pulley 5 and the motor 6; each individual kneading trough 1 faces or is brought face to face with a flour dispenser 7 and a high temperature ferment dispenser 8. The flour dispensers 7 are connected with a distributor 9 fed by a storage hopper 10 the rate of outflow of which is regulated by an appropriate valve 11.

The high temperature ferment dispensers 8 are connected with a distributor 12 fed from a storage container 13 by means of a pump 14, whereby the rate of outflow of aforesaid container 13 is regulated by an appropriate valve 15.

Under the individual kneading troughs, a conveyor 16 onto which the dough-lumps P are deposited has been illustrated in a diagrammatic way. Since the rate of flow of the distributors 9 and 12, as well as the loading and emptying operations of the individual kneading troughs 1 must be strictly synchronized, a program selector has been represented diagrammatically in FIGURE 1 by a block-diagram 17, this program selector containing the various switching devices which control the electrical equipment of the machine.

It is most essential that the temperature be maintained practically constant from the beginning right to the end of the method, including the actual formation of the dough-lumps; this temperature, which is comparatively high and at least 38° C., can be maintained either throughout the whole machine, or locally. In the diagrammatic representation of FIGURE 1, the whole machine is mounted in an air-conditioned enclosure B.

In any case, in a machine designed in this way, it will be possible, by discrete weighings on the one hand of the flour periodically introduced into the hopper 10, and on the other hand of the ingredients, including salt, of which the high temperature ferment is made, periodically introduced into the container 13 to ensure at a fast rate the periodic filling of the individual kneading troughs 1 whilst the dough-lumps prepared therein will be discharged therefrom at the same rate.

Aforesaid kneading-troughs 1 can be grouped, aligned or disposed in any convenient way, more especially in order to promote continuous production, to reduce the bulk of the machine, to save driving power and to facilitate the loading and the unloading of a plurality of individual kneading troughs by means of the same mechanism or parts.

Such a practical embodiment is represented in FIGURES 2 to 9.

In this machine, at least one group of individual kneading troughs 1—in the present instance two—are used, the kneading shafts 2' of which are parallel and disposed along a circle which is concentric to the axis of rotation 18 of the drum 19 in which aforesaid kneading troughs are recessed. Aforesaid drum 19 is hollow and therefore consists of a chamber 20 of annular cross-section and extending over the whole length of aforesaid drum. By means of this chamber, it is possible to design a heating system in order to ensure the comparatively high temperature which is required for applying the method conforming to the present invention. Aforesaid chamber can be inserted in a circuit in which a heating fluid circulates, so as to form a kind of water-bath; or use can be made of resistive electric heating elements, as shown diagrammatically by the rods marked 21, such resistances being conveniently disposed inside the chamber.

All kneading troughs are identical and equally spaced around the axis or shaft 18. Their shape is quite special and it consists of a cylindrical part 22 which is tangent to a plane part 23 which is nearly at right angles to the periphery of aforesaid drum 19. This straight part forms one of the sides of the inlet of the kneading trough, whereas the other side is formed by a small plane part 24 which is parallel to the first. The shaft 18 of the drum rotates in bearings 25–26 fastened on brackets to the general framework 27. Onto the said shaft 18, a ring gear 28 is keyed which engages a pinion 29 driven by a motor 30.

Each individual kneading trough shaft 2' carries a pinion 31 on one of its ends, whereby the pinion carrying ends are all disposed on the same side. Between each pair of pinions 31, there is a pinion 32 keyed to the shaft of an electric motor 33, so that two kneading troughs or two series of aligned kneading troughs can be driven by the same electric motor.

Separate motors could also be used for each kneading trough or group of aligned kneading troughs, while on the other hand one common drive could be provided for all kneading troughs, for instance by engaging all pinions 31 with a common ring gear driven by a single motor.

The drum 19 rotates inside a fixed cylindrical jacket 34 which rests on the frame 27 of the machine. This jacket is provided with an inlet opening 35 extending into a lead-in 36, and with a lower opening 37 through which the dough-lumps are discharged. The lead-in 36 through which the constituents of each dough-lump are fed is headed by a hopper 38 divided into two compartments 39–40 by a partition 41. The bottom of this hopper is formed by a slider 42 which can be subjected to an alternating rectilinear motion, for instance under the action and the control of a pneumatic and hydraulic device which has been shown in FIGURE 4 and marked 43. The lower part 44 of aforesaid hopper can be fitted onto or made to face aforesaid lead-in 36.

Into the compartment 40, which is generally the smaller, plunges a tube 45 issuing from a feeding and dispensing device which, in the present instance, is represented by a mixer 46 and a pump 47 combined with a volumetric liquid dispensing and measuring device.

In the larger compartment 39 plunges the tube 48 of a volumetric dispensing and measuring device 49 which is itself directly connected to a hopper 50 which contains the reserve of flour. Preferably, the machine will comprise as many reserves and volumetric dispensing devices for the flour as there are separate rings of individual kneading troughs, although there may be an advantage in using one single reserve with volumetric dispenser 46–47 for feeding the machine, considering that in this case it will be enough to provide as many feeding tubes 45 or branches of aforesaid feeding tube 45 as the machine comprises separate rings of individual kneading troughs.

Figure 2:
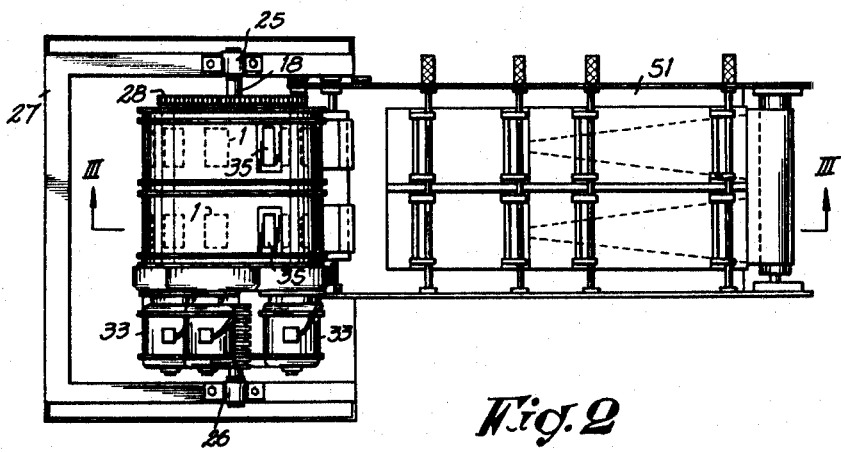
FIGURE 2 is a top view of a machine provided with a drum conforming to the present invention, whereby the parts belonging to the superstructure have been removed.

Concerning the discharge of the dough-lumps one by one, use can be made, as represented diagrammatically in FIGURES 2 and 3, of a "roller" 51 of known design, which has however been adapted for satisfying the requirements of the method conforming to the present invention, and for which purpose a heating device, for instance by means of electrical resistances 52 and/or 53 have been duly provided and divided along the path of the dough-lumps. Between aforesaid "roller" and the discharge opening 37 of the machine, a funnel 54 has been provided over a pair of rollers 55–56.

The machine as described above must evidently be supplemented by the required electrical circuits and the whole electrical equipment comprising various elements known as such, for instance the switches needed for ensuring the continuous and automatic operation of the machine.

Provision could also be made for combining the rotating drum 19 with at least one micro-switch for keeping each individual kneading trough at a short standstill over the inlet 35, although in most cases such a standstill will not be required. In a similar way, the mechanism which controls the rotation of the rollers 55–56 could be controlled by at least one micro-switch in order to stop aforesaid rollers for a moment each time that a kneading trough comes in front of the opening 37 through which the dough-lumps are discharged.

This halting device will generally only be required on machines which rotate at a fairly high speed, in order to provide the necessary time for assembling the various fragments of dough-lumps before these are brought onto the roller.

The design of the electrical circuit, as well as the elements of the program selector are left to the choice of those conversant with the art, the various apparatus being selected from those available on the market, according to the peculiar requirements of the machine.

It will be observed that, despite its comparatively high rate of production and its very satisfactory thermal efficiency, this machine can be constructed into a very compact form taking up a minimum of space.

These advantages confer to the means for the automatic production of dough-lumps, entirely novel characteristics.

The characteristic features disclosed by the present invention can be applied to the construction of small machines with a limited number of individual kneading troughs, as well as to the construction of very large machines of almost unlimited output by increasing the numbers of individual kneading troughs comprised in each bank in any adequate manner, but generally by disposing them so as to form rings or drums, considering that this characteristic addition offers many advantages for a practical and compact design.

The present invention concerns all and sundry machines of this type as well as any characteristic features contained therein.

What I claim is:

1. Machine for the continuous production, at a very fast rate, of dough-lumps for bakeries, comprising in combination at least one container for a reserve of flour; at least one container for a reserve of ferment at high temperature; a plurality of individual kneading troughs of which the capacity corresponds to the amount of dough needed for a dough-lump; stirring and kneading elements in said kneading troughs; means for conveying each time towards said kneading troughs separate amounts of flour duly measured for corresponding to a dough-lump; means for conveying toward said kneading troughs said ferment at high temperature in separate amounts of which each one corresponds to the amount required for a dough-lump; means for driving said stirring and kneading elements of said individual kneading troughs at a high speed which is generally comprised between 200 and 750 r.p.m.; means for ensuring the discharge of the dough-lumps from said individual kneading troughs; and conditioning devices in order to maintain the constituent ingredients, i.e. said flour and ferment, of the dough-lumps, inside the machine, as well as the dough-lumps themselves, at a minimum temperature of between 38° C. and 45° C.

2. Machine according to claim 1, wherein said individual kneading troughs are mounted on a drum which rotates about a rotation shaft inside an outer jacket provided with an inlet for the ingredients required for each dough-lump and with an outlet for the finished dough-lumps.

3. Machine according to claim 2, wherein at least one series of kneading troughs is recessed in said drum, said kneading troughs being concentrically disposed with said shaft and said drum being hollow and comprising a heating device, constituting one of said conditioning devices, for maintaining said ingredients and said dough-lumps at a constant temperature comprised between 38° C. and 45° C.

4. Machine acording to claim 2, wherein said drum is part of a closed circuit in which circulates a heating fluid the temperature of which is controlled.

5. Machine acording to claim 2, wherein each of said kneading troughs consists of a cylindrical chamber opening at the periphery of aforesaid drum and the entrance to which is delimited on the one hand, by a plane which is tangent to aforesaid cylindrical chamber, and on the other hand by a small plane wall parallel to the first one, whereby both plane walls are slightly inclined with respect to the periphery of aforesaid drum.

6. Machine according to claim 2, wherein said individual kneading troughs are aligned along successive generating lines of the drum, the individual kneading troughs thus aligned being driven by a common shaft.

7. Machine according to claim 6, wherein the common shafts of individual kneading troughs disposed along same generating lines of the drum are each provided with their own driving motor.

8. Machine according to claim 7, wherein the operating circuit of said motor when at least one kneading trough faces the means through which said ingredients are fed, in order to keep said trough at a standstill during the short time which is required for filling them.

9. Machine according to claim 6, wherein the shafts which are common to the individual kneading troughs arranged along the same generating lines of the drum, are each of them, driven by the same drive consisting for instance of pinions meshing with a ring gear which in turn is driven by a single motor.

10. Machine according to claim 6, wherein the shafts which are common to the individual kneading troughs arranged along the same generating lines of the drum, are driven, by pairs, by a single motor and a set of pinions.

11. Machine according to claim 2, wherein face to face with said outlet is arranged at least one pair of rollers driven by a motor the circuit of which stops said motor during a short time whilst the dough-lumps are discharged.

References Cited
UNITED STATES PATENTS

| | | | |
|---|---|---|---|
| 1,861,803 | 7/1932 | Lauterbur et al. | 107—4 |
| 2,953,460 | 9/1960 | Baker | 107—4 |
| 3,207,089 | 9/1965 | Ivarson | 107—4 |

WALTER A. SCHEEL, *Primary Examiner.*

J. SHEA, *Assistant Examiner.*